United States Patent
Koul et al.

(10) Patent No.: US 8,225,112 B2
(45) Date of Patent: Jul. 17, 2012

(54) USING HISTORIC LOAD PROFILES TO DYNAMICALLY ADJUST OPERATING FREQUENCY AND AVAILABLE POWER TO A HANDHELD MULTIMEDIA DEVICE PROCESSOR CORE

(75) Inventors: Manoj Koul, Sunnyvale, CA (US); Torsten Fink, Hayward, CA (US)

(73) Assignee: Nytell Software LLC, Wilmington, DE (US)

( * ) Notice: Subject to any disclaimer, the term of this patent is extended or adjusted under 35 U.S.C. 154(b) by 929 days.

(21) Appl. No.: 11/995,091

(22) PCT Filed: Jul. 14, 2006

(86) PCT No.: PCT/IB2006/052417
§ 371 (c)(1),
(2), (4) Date: Oct. 31, 2008

(87) PCT Pub. No.: WO2007/007300
PCT Pub. Date: Jan. 18, 2007

(65) Prior Publication Data
US 2009/0210654 A1    Aug. 20, 2009

Related U.S. Application Data

(60) Provisional application No. 60/699,837, filed on Jul. 14, 2005, provisional application No. 60/748,335, filed on Dec. 6, 2005.

(51) Int. Cl.
*G06F 1/00* (2006.01)
*G06F 1/26* (2006.01)
*H04N 5/93* (2006.01)

(52) U.S. Cl. .................. 713/300; 713/322; 386/353
(58) Field of Classification Search .................. None
See application file for complete search history.

(56) References Cited

U.S. PATENT DOCUMENTS

| | | | | |
|---|---|---|---|---|
| 5,604,731 | A * | 2/1997 | Grossglauser et al. | 370/232 |
| 7,243,041 | B2 * | 7/2007 | Nalawadi et al. | 702/132 |
| 7,386,739 | B2 * | 6/2008 | Ghiasi et al. | 713/300 |
| 7,409,093 | B2 * | 8/2008 | Ju | 382/232 |
| 7,424,528 | B2 * | 9/2008 | Cherkasova et al. | 709/224 |
| 7,478,260 | B2 * | 1/2009 | Spencer | 713/600 |
| 7,804,435 | B2 * | 9/2010 | Sadowski et al. | 341/155 |
| 2003/0184271 | A1 | 10/2003 | Aisaka et al. | |
| 2004/0139362 | A1 * | 7/2004 | Inaba | 713/322 |
| 2006/0123253 | A1 * | 6/2006 | Morgan et al. | 713/300 |
| 2006/0255964 | A1 * | 11/2006 | Wong et al. | 340/855.8 |

FOREIGN PATENT DOCUMENTS

| | | |
|---|---|---|
| EP | 1351118 A2 | 10/2003 |
| WO | 0038038 A1 | 6/2000 |
| WO | 03005729 A1 | 1/2003 |

* cited by examiner

*Primary Examiner* — Ji H Bae
(74) *Attorney, Agent, or Firm* — McAndrews, Held & Malloy, Ltd.

(57) ABSTRACT

A technique is provided for use in a handheld multimedia device that uses the historical load profile statistics of a particular multimedia stream to dynamically scale the computational power of a computing engine, depending upon the complexity of the multimedia content and thereby reduce the power consumption for computationally less intensive content and consequently reduce the power consumption by a significant amount over a duration of time.

20 Claims, 5 Drawing Sheets

USING HISTORIC LOAD PROFILES TO DYNAMICALLY ADJUST OPERATING FREQUENCY AND AVAILABLE POWER TO A HANDHELD MULTIMEDIA DEVICE PROCESSOR CORE Currently, power consumption is an area of active research in applications where streaming or playback of multimedia content is required on handheld or portable devices. Some handheld devices have fixed low power settings that help to reduced power consumption of the CPU depending upon the architecture of the system and the silicon system on which the application is running. Other handheld devices use low power techniques or technology in the design of the silicon itself to help reduce the overall power consumption. In yet other applications, power management techniques for handheld multimedia applications do not exist or are not used.

One of the most widely used power saving techniques in handheld devices is accomplished by setting the operational frequency of the CPU/Hardware and the memory at a predetermined upper limit. The predetermined upper operational frequency limit is one that will enable most present day multimedia content to be decoded and played back on a handheld device. It is a one speed fits all situations type of solution. What is needed is method and apparatus for conserving power in a handheld multimedia device that is not a one speed solution, but instead provides a technique for better optimization of power during multimedia encoding or decoding functions on a handheld device.

Embodiments of the invention utilize a technique that uses the historical load profile characteristics of a particular multimedia data stream to dynamically scale the computational power of a computing engine depending upon the complexity of the multimedia content and thereby reduce the power consumption for computationally less intensive content and consequently reduce the power consumption by a significant amount over a duration of time. Embodiments of the invention collect complexity model statistics related the CPU/DSP load and available bandwidth when a particular multimedia data stream is played a first time. When the particular data stream is played a second time, embodiments of the invention use the complexity model statistics to adjust the CPU/DSP operating frequency to a necessary or optimal frequency so the particular data stream can be encoded/decoded by the CPU/DSP smoothly, but power is not wasted. The necessary frequency is generally lower than the handheld multimedia device's maximum operating frequency. The frequency of operation is dynamically controlled based on the complexity profile.

Furthermore, the operating voltage of the CPU/DSP core can be adjusted based on historic load characteristics to a necessary or optimal voltage that does not waste power for the particular data stream. In other words, the operating voltage of the CPU/DSP device is statically set to a minimum voltage that will allow the CPU/DSP core to operate within the frequency range as determined in the complexity profile and provide quality results for the handheld multimedia device. However, the operating voltage can be adaptively changed for another data stream's complexity profile.

In yet additional embodiments of the invention, the memory operating frequency is dynamically adjusted to operate at an optimal frequency for playing a particular data stream based on historic load characteristics of the particular data stream.

It is understood that, the above summary of the invention is not intended to represent each embodiment or every aspect of the present invention.

A more complete understanding of the method and apparatus of the present invention may be obtained by reference to the following Detailed Description when taken in conjunction with the accompanying Drawings wherein.

Figure 1:
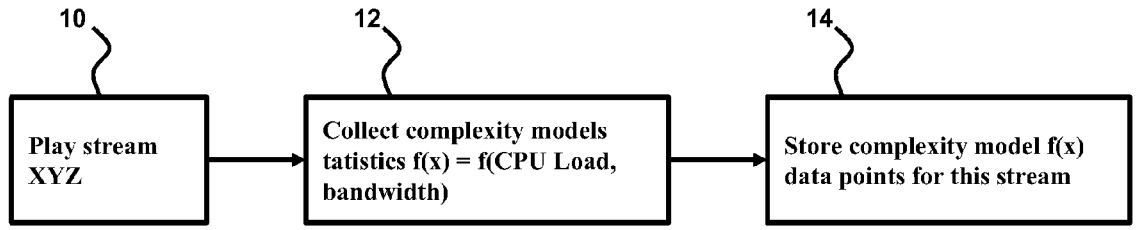
FIG. 1 is a flow diagram of a first playing of a particular multimedia data stream in accordance with an embodiment of the invention.

Currently, techniques used to conserve the energy usage of a CPU in handheld devices that process multimedia data are not optimized. Current day systems don't investigate and take the nature or complexity of the multimedia content into consideration when determining a proper amount of power or the operating frequency to provide the CPU for handling a particular multimedia content. That is, current power-save techniques do not provide dynamic and optimized power save methods. Also, current fixed power saving systems can be the cause problems, such as video/audio drops in the playback and/or the playback quality can worsen, due to the handheld's hardware capabilities being limited by a power budget control being set to a predetermined, pre-estimated limit.

One of the biggest challenges currently facing the handheld multimedia device industry is how to get multimedia applications to run on portable handheld devices and other portable devices while optimizing the power used by the device based on the particular multimedia application being run. Typically multimedia applications consist of video/audio decode/encode functions, which are computationally intensive and hence require on board Digital Signal Processors (DSPs) to run at high frequencies to accomplish the encode/decode functions so that the user does not see or hear drops or breaks in the playback. Operating the CPU's and/or DSPs at high frequencies contributes to the high power consumption of these multimedia type applications.

Since the computational power required for these decoding/encoding functions is not linear over time and depends mainly on the complexity of the video/audio multimedia content, embodiments of the present invention may monitor, measure and store data relative to the complexity of a particular multimedia application the first time it is run on the handheld device. Thus, the next time the same multimedia application is run on the handheld device, the power to the DSPs and/or CPUs can be adjusted to provide a minimum amount of power to run the application without effecting proper performance of the application run to the extent it would be visually or audibly noticeable to the user.

In general, other embodiments of the present invention use an exemplary technique(s) that dynamically scales the computational power of the DSP depending upon the complexity of the content and thereby reduces power consumption for computationally less intensive multimedia content and hence reduces the overall power consumption by a significant amount over a duration of time. The necessary historical load profile statistics of a particular bit stream, or application, can be saved and can be used to optimally scale the frequency and/or voltage of the CPU, DSP and frequency of the DDR (DDR-SRAM) when the same content is played in future.

Embodiments of the invention have been tested and validated on a PNX1500 SOC, which incorporated a TM3260 Core (microprocessor core) and is running MPEG4/MPEG2 player applications therewith. The clock frequency of operation is dynamically reconfigurable for this Core. Also, the memory frequency of operation can be changed and/or the operational voltage provided to the memory can be dynamically configured to reduce power consumption. The power savings with the methods described can be calculated by using the V2F method. The V2F technique is based on a physics principle that states that the power required by a processor device is proportional the voltage squared times the frequency of operation.

Embodiments of the invention can be used to variably regulate/optimize power consumption of playback for MPEG2/MPEG4/H.264/Windows Media video and associated audio like MP3, Windows Media Audio, AAC and other multimedia data streams and applications.

Previous techniques that are limited to using fixed budget power settings, or advances in process technology, or a fixed power savings design of silicon for multimedia applications do not address the dynamic nature of the performance and power requirements of multimedia content.

Lots of the previous power conservation techniques for handheld multimedia devices fall short of being very successful due to loss of playback quality which is usually caused by a low fixed computing budget or limitation of computing resources. Also, there is often excess power dissipation in the playback or streaming of multimedia content wherever the fixed computing budget is excessive and not necessary.

Hence techniques, such as those according to embodiments of the present invention that would address the need for optimal playback of multimedia content and optimal power savings would provide the absolute power consumption savings.

Thus, embodiments of the present invention perform dynamic control over the power consumption required for multimedia applications depending upon the dynamic characteristics of the application and the content. Invention embodiments provide an optimal power control without sacrificing the playback quality. One of ordinary skill in the art would understand that embodiments of this invention, when combined with advances in the low power silicon design and manufacturing technology, can greatly reduce the power consumption required for multimedia applications, which are performance intensive and thus contribute to a large percentage of power usage and dissipation on a handheld multimedia device.

Furthermore, embodiments of the invention also feature a fine control mechanism or means for greatly reducing power consumption of the CPU, DSP and/or DDR memory, yet still enable optimal quality playback on a handheld multimedia device when compared to previous contemporary techniques wherein playback quality is reduced to a certain extent by performing and providing a reduced resolution video display or a reduced audio quality in those parts or durations of a compressed/uncompressed data stream that consumes computing resources that are greater than what is budgeted.

Further embodiments of the present invention provide a dynamic power control and save mode. The power and/or clock frequency provided to a handheld multimedia device's CPU/hardware and memory operational frequency is controlled based on the multimedia content characteristics. By controlling the power and clock frequency that is provided to predetermined components within a handheld multimedia device, a real power savings can result along with predictable performance of the handheld multimedia device. Such exemplary control can be used to switch to a low-resolution decode/encode mode in order to stay within a particular power budget, yet still maintain a high picture/sound quality by accurately calculating and scaling the device system performance prior to playback so that the power provided to the device circuitry is optimized for a playback with graceful degradation thereby preventing audio/video drops and playback problems.

Referring now to FIG. 1, in various multimedia portables and handhelds the same audio streams are generally played over and over again a number of times. This is true for video data streams such as those for movies, video clips, video games etc. When a new data stream is played on a handheld device/player 10, the data stream's load statistics are collected over the time the data stream is played 12. The statistics that are collected include:

1). CPU/DSP load required per frame (video/audio)
2). Memory Bandwidth.

These statistics are saved 14 to memory (stored on the flash, local hard disk or other onboard memory storage) and tagged to be associated with the particular data stream. From the statistical data collected, a load profile is calculated for the particular data stream and stored on a flash or local hard disk of the hand held player or, in another embodiment, a hash value is calculated from the stream properties and stored in the complexity/load profile associated with the particular data stream.

Figure 2:
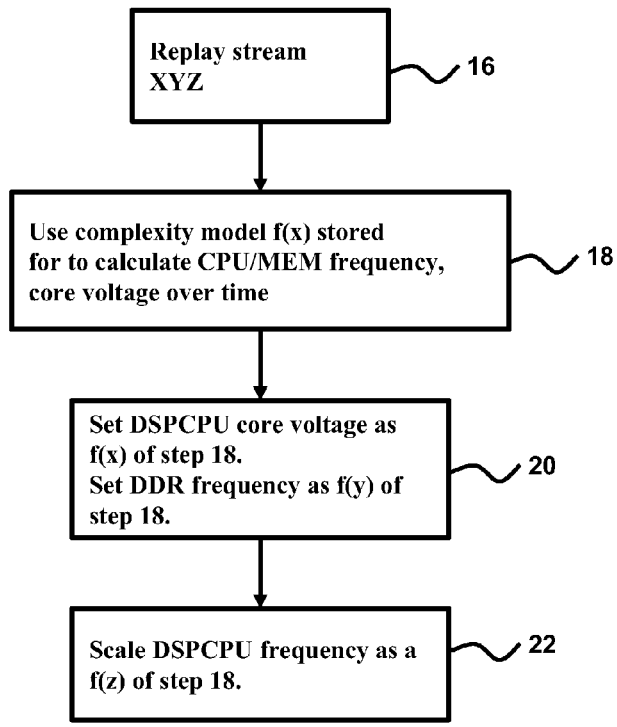
FIG. 2 is a flow diagram of a replay of the particular multimedia data stream in accordance with an embodiment of the invention.

Referring now to FIG. 2, when the same data stream is played again 16, the optimal setting for the DDR memory frequency and the CPU core voltage can be retrieved for the particular data stream from memory storage and then be calculated 18 and set 20. The CPU frequency of operation can also be dynamically adjusted to cater to the load/complexity profile of the stream and avoid an unnecessarily high operational frequency (MHz) of the DSP thereby reducing overall power dissipation 22.

The limiting factor in this case is the amount of data that can be stored when collecting the statistics for a plurality of different data streams. For example, if 100 audio songs are stored on the handheld device, then 100 statistical load related settings (stream load complexity profiles) must be stored as well (e.g., one or more for each digital audio data stream). Since a handheld device has a finite amount of memory, perhaps in some embodiments of the invention, over a predetermined period of time or after a predetermined amount of designated memory space is used, the LRU (Least Recently Used) stream load complexity profile is erased in order to make room for a newly created or calculated stream load complexity profile. Thus, in this alternative embodiment, not all of the previously played and stored data streams or applications may have an associated stream load complexity profile in storage, but at least a plurality of the most recently used applications or played data streams will have such a stream load complexity profile therefore. Data streams that have not been played or applications that have not been used for a long time may have to have new data points generated collected when they are played or run again.

Figure 5:
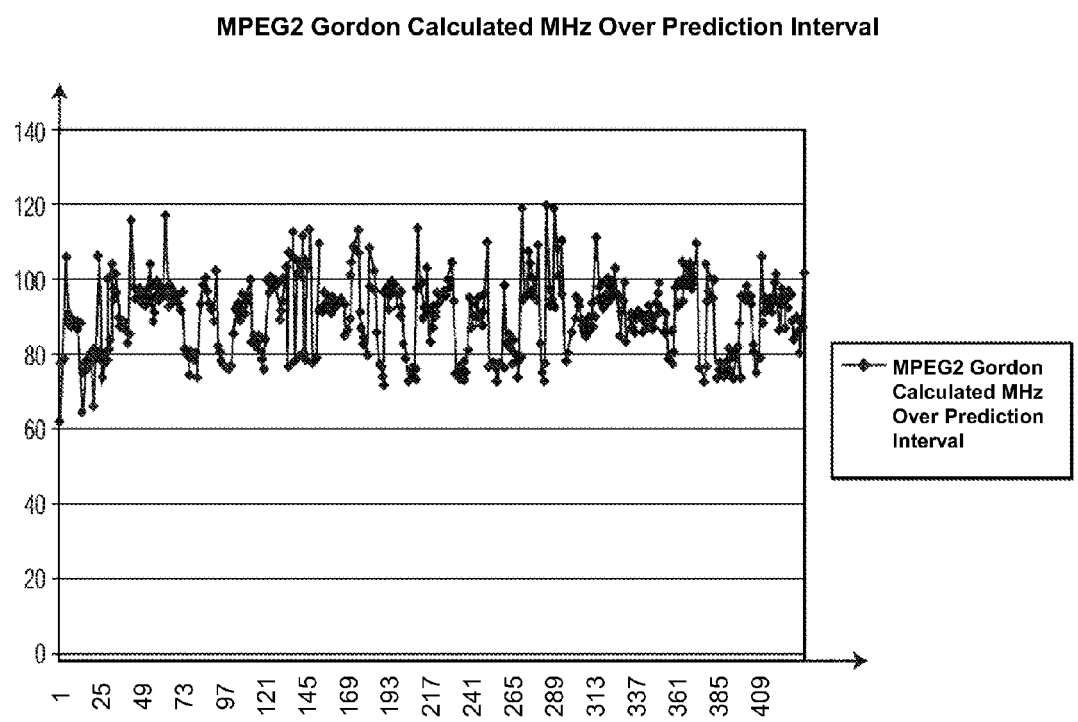
FIG. 5 is a graph of a CPU required operating frequency in MHz for a particular interval of a multimedia data stream.

Referring to FIG. 5, a validation of this exemplary technique was performed for MPEG2 and MPEG4 Video Playback on a PNX1500 Soc, which has a Trimedia TM3260 CPU core. The statistics collected included CPU MHz consumption per frame and the memory bandwidth requirements per frame in the first run of the bit stream. The statistics where then saved as the stream load complexity profile for the particular data stream in memory.

Such a stream load complexity profile for a particular data stream may be calculated or provided in variety of ways, wherein:

A CPU MHZ/per frame=CPU Cycles/frame*frequency of operation*Nfps

Nfps is the Number of frames per second to be decoded, which, for example, is 25 for PAL, 30 for NTSC and so on. An exemplary program portion for calculating and storing aspects of a stream load complexity profile for the particular data stream may be shown as:

```
while(!endOfStream)
    loadProfileMemory[frame_number] = CPU MHZ spent/frame;
    //Store in Memory
    MemoryBandwidth[frame_number] = DDR Memory Controller
    Measurements/frame;
    Frame_number++;
```

Before a subsequent run of the same data stream, embodiments of the invention may:

a. Find the maximum CPU frequency of operation, scale the DDR frequency of operation to a 3:2 ratio of the CPU frequency of operation or in the neighborhood of this value. Calculate the Core Voltage Operation required and set the Core voltage of the Chip by setting it up on the power regulator, which has an I2C interface to communicate with the CPU. Set the DDR frequency to the calculated value. The DDR frequency also depends upon the memory bandwidth requirements. If the memory bandwidth required is higher, the DDR frequency has to be setup accordingly.

Max CPU MHz required (CpuMHzmax)=MAX(loadProfileMemory[0] . . . loadProfileMemory[Total Number of frames−1])

From the specifications given for PNX1500 and TM3260, or whatever the CPU platform is being used, the minimum core voltage required to run the CPU at this operational frequency is derived. Considering that there are overheads in a real system, these overheads should be added to the frequency (MHz) and an additional cushion of about 5-10% should be added. After the maximum frequency required for the particular data stream is calculated, then the CPU core voltage can be setup:

DDR Memory frequency=OptCpuMemRatio*CpuMHzmax+$f$(MB);

$f(0)$=0, if Memory Bandwidth is optimal at that frequency, else $f$(MB)=Memory Bandwidth requirement for the CPU calculated above the frequency of operation taking latency into consideration.

OptCpuMemRatio is the inverse of the optimal CPU to Memory Ratio to be used for the system. In this case 3:2.

b. Set the number of frames (N) for which a particular load profile will be calculated. It was calculated by setting N to 10 and N to 30 frames for the MPEG2 & MPEG4 video playback application.

c. Find the maximum MHZ required for the next N frames, calculated the frequency for the CPU and set it for the next N frames.

CPU MHz required in interval $i$(CpuMHzmax)=MAX (loadProfileMemory[$n$+1] . . . loadProfileMemory[$n$+1+$N$])

d. At the end of the N−1 frame, calculate the CPU frequency required for next N frames and set the frequency of operation to this number. Repeat Step (c) till the end of the stream.

Still referring to FIG. 5, and from measurements made here is an exemplary case for an MPEG2 video playback. The measurements were as follows.

MPEG2 Playback:

Data Stream: Gordon MPEG2 elementary Stream (gordon.mv2), which is a 720×576 full D1 PAL stream.

A PNX1500 development board was used for these experiments. For normal playback of MPEG2 video, the CPU is set to 200 MHz and the DDR to 166 MHz frequency. The Core Operational Voltage is originally set to 1.3V for the data stream.

When the data stream was played it was determined from the playback statistics the maximum MHz required for the stream=120 MHz. Considering 20% overhead, the MHz required=144 MHz of CPU. Hence as discussed above, the memory operational frequency would be set=100 MHz.

From the Processor specifications it is determined that the core voltage required to drive the CPU at this speed is about=0.9V, however, in the experiment, the voltage was set to 1.0 V instead for simplicity sake.

When the same data stream was played again, the current consumption was decreased by about 37%, which translates to a substantial power savings of about 37%. Again the CPU core voltage can be dynamically controlled to reduce power consumption depending on the MHz required, however due to hardware limitations on the board it was not done in the experimental embodiment.

From the CPU Frequency statistics and dynamically reconfiguring the CPU Operational frequency, the average MHZ required over all the measurement intervals would be=91 MHz+20% Overhead=110 MHz.

By using the V2F method, herein incorporated by reference, the estimated power saving would be about 50%. When performing a playback with these statistics we see a current reduction of about 46% on average.

Embodiments of the present invention can be used in various handheld multimedia devices, including without limitation, mobile multimedia devices, cell phones that playback multimedia content, personal digital assistants (PDAs), personal media players, digital media adapters, portable X-Box®, Gameboy® or other portable game devices, video cameras, digital cameras, handheld GPS devices, and other kinds of multimedia devices where power consumption is a concern.

Figure 3:
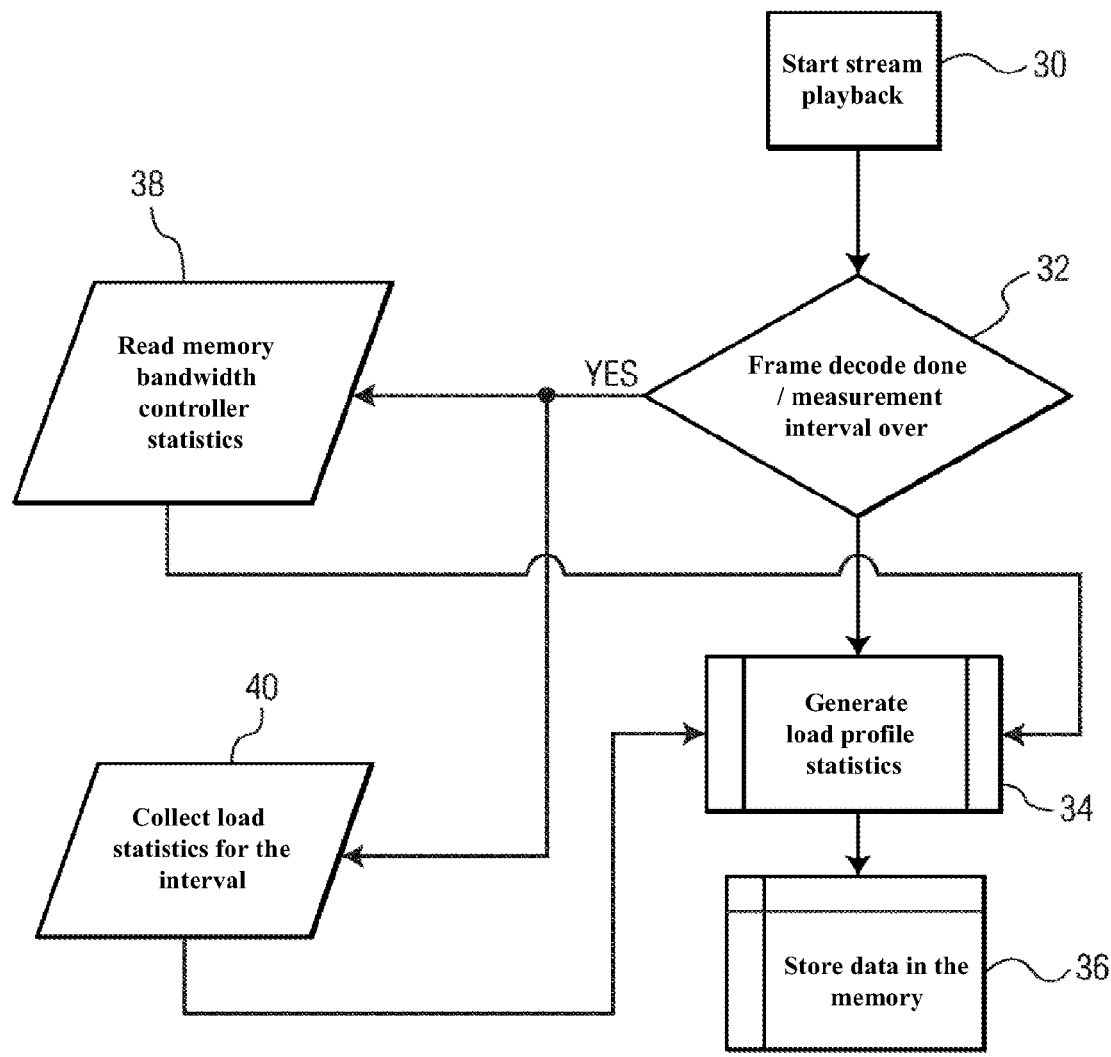
FIG. 3 is a flow diagram of another embodiment of the invention.

FIGS. 2 and 3 depict additional embodiments of present invention. It should be noted that during the first play of a data stream statistical information is collected. The collected data profile can be stored after the data steam is played or can be used to calculate the various aspects of the stream load complexity profile (i.e. CPU frequency requirement, Memory frequency requirement, CPU voltage and/or current requirement, etc) and then save the calculated stream load complexity profile for the particular data stream. Having the calculations made after a new data stream is played or before a particular data stream is played-again are variations on embodiments of the invention.

FIG. 3 depicts an exemplary method of dynamically calculating the necessary or optimum frequency and power needed to play a particular data stream or run a particular application on a handheld multimedia device. At step 30, a particular data stream is selected by a user to be played. The particular data stream may have already been played on the handheld multimedia device or it may be the first time that the particular data stream has ever been played on the handheld device. At step 32, the handheld device determines whether the particular data stream has ever been played or run on the device before and whether the data frames (or data) had been decoded before. Also, at step 32, the handheld device determines whether a profile for the particular data stream has been created and still exists in memory on the handheld device. In some embodiments, a time interval may have elapsed so that the data complexity profile for the particular data stream has been overwritten by a data complexity profile for another more recently played data stream. If at step 32 a data complexity profile does not exists for the particular data stream, then at step 34, load characteristics and frequency bandwidth requirements are generated while the particular data stream is played or run on the handheld multimedia device. At step 36, the load profile statistics for the particular data stream are stored in memory.

If at step 32 it is determined that a load profile for the particular data stream exists in memory, then at step 38, the memory bandwidth statistics may be read from memory and load statistics are read from memory. The statistics are used to create a data complexity profile prior to playing or running the particular data stream. The data complexity profile for the particular data stream may be tagged and stored in memory so that it can be retrieved at a later time when the particular data stream is played again.

In general, a data complexity profile provides information to the electronics of the handheld multimedia device to set the CPU, DSP and/or memory operation frequencies. The data complexity profile may also include information to set the overall power, voltage or current being provided to the CPU and/or DSP devices in the handheld multimedia device. Memory bandwidth statistics and/or CPU load or frequency statistics are data accumulated on a frame by frame basis (statistical sampling of frame basis) of the particular data stream as it is run or played on the handheld multimedia device.

Figure 4:
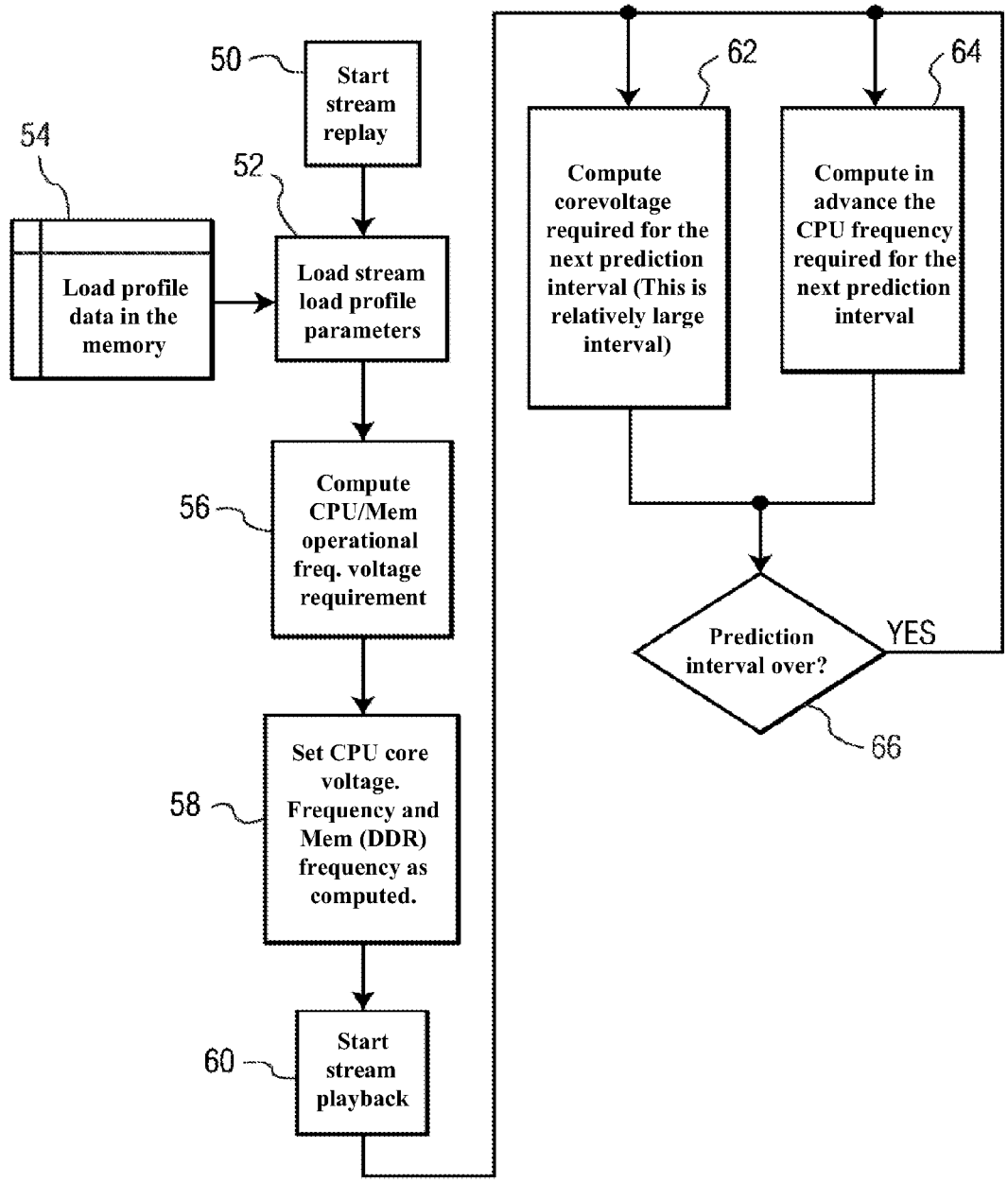
FIG. 4 is a flow diagram of yet another embodiment of the invention.

FIG. 4 depicts another embodiment of the present invention. Here, the data stream is divided into intervals and each interval of the particular data stream has its own data complexity profile. At step 50 a particular data stream is requested to be replayed on the handheld multimedia device. At step 52, the previously stored data stream load/data complexity profile parameters for each interval of the particular data stream are found in memory 54 for use while the particular data stream is being decoded/encoded. In other embodiments, the interval is not a portion of the stream, but rather the whole particular data stream. At step 56, the CPU/DSP operational frequencies are computed for a data stream interval. Also, the operational memory frequency is calculated. In various embodiments, the necessary operational frequencies of the CPU, DSP and memory are each different for the same data stream interval. In other embodiments the operational frequency of the memory is related to the CPU or DSP operational frequency by a ratio. The necessary or optimal voltage, power and/or current requirement for the CPU/DSP devices are also calculated. At step 58, the CPU core voltage and frequency are set based on the calculations for the data stream interval. The memory frequency is also set.

At step 60, the data stream is provided to the processor core for encoding/decoding. The first data stream interval is processed and playback of the data stream (or running of the application) contents begins. At steps 62 and 64, the CPU voltage and frequency for the next data stream interval is computed for the next data stream interval (prediction interval). Furthermore, the frequency of the memory devices may also be calculated for the next data steam interval frequency.

At step 66, it is determined that the next data steam interval is over and the method loops back to make calculations for the subsequent data stream interval.

In other embodiments of the invention, during the first playing of a particular data stream, calculations for CPU/DSP voltage and frequency are made and stored for each data stream interval in a particular data stream or application. When the particular data stream or application is played or run at a later time, the previously calculated voltages and frequencies for each data stream interval are retrieved from memory and used to set operational frequencies and voltages as each data stream interval is processed by the core. This embodiment eliminates extra calculations while the data stream is being played back and may further reduce the power load on the handheld multimedia device.

Thus, one of ordinary skill in the art will understand that embodiments of the present invention, provide among other things, a technique that uses the historical load profile statistics of a particular multimedia stream to dynamically scale the computational power of a computing engine, depending upon the complexity of the multimedia content, and thereby reduce the power consumption for computationally less intensive content and consequently reduce the power consumption by a significant amount over a duration of time.

Figure 6:
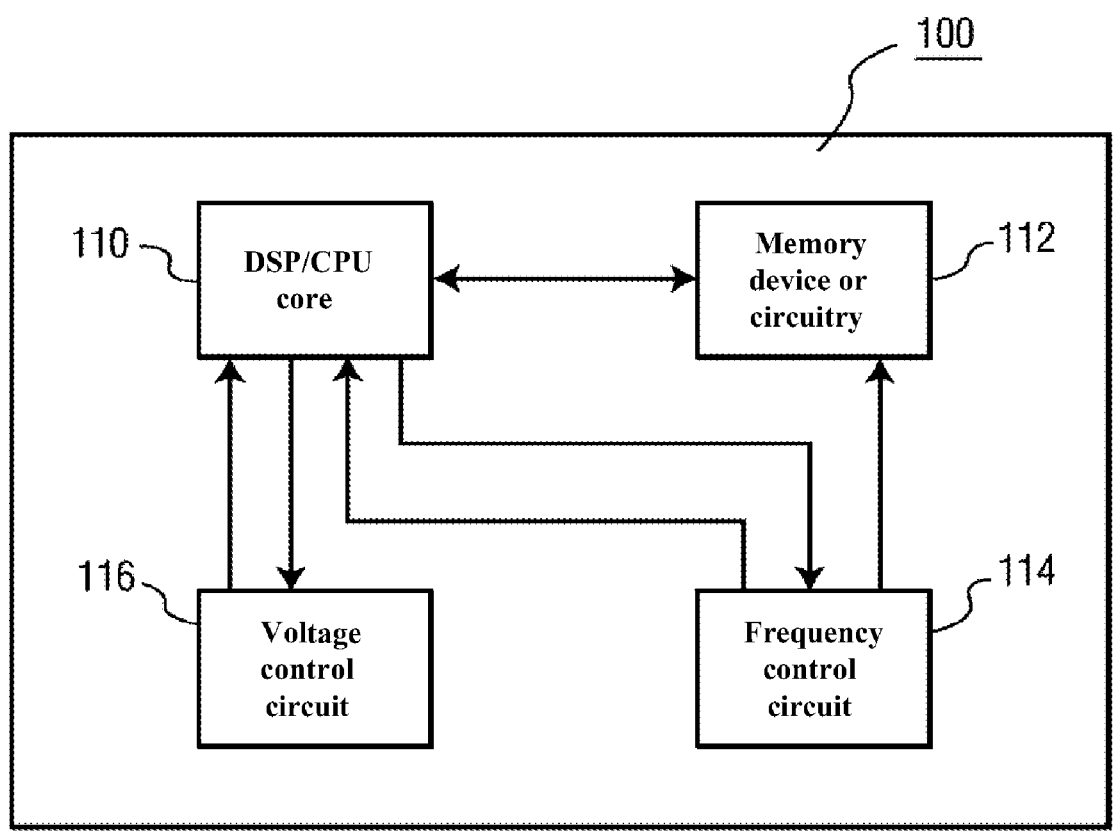
FIG. 6 is a simplified block diagram of an exemplary handheld multimedia device.
Figure 1:
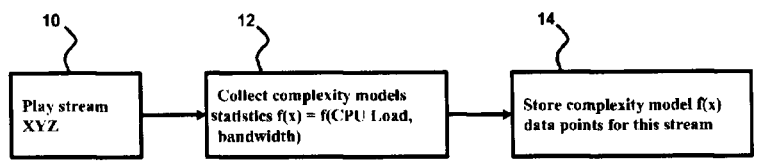
Figure 2:
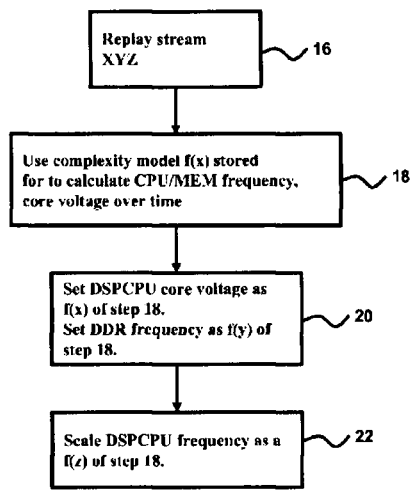

Referring to FIG. 6, a simplified and basic block diagram of an exemplary handheld multimedia device 100 is shown. The DSP/CPU core 110 performs, among other things, encoding and decoding of multimedia data streams. The multimedia data streams are stored in a memory device or circuitry 112. Frequency control circuitry 114 receives frequency control signals from the CPU that direct the frequency control circuitry to change the operating frequencies provided to the DSP/CPU core 110, the memory 112 or both. Furthermore, the core 110 also provides control signals to the voltage control circuit 116 to adjust the voltage provided to the core 110 and in particular, the CPU and/or DSP circuitry in the core so that energy is not wasted during encoding or decoding of the multimedia data stream.

The memory 112 may also store tagged data that corresponds to previously played or run multimedia data streams. The tagged data is used by core 110 to calculate and set an optimal operating frequency of the core 110 and the memory 112. The tagged data can also be used by the core to calculate an optimal operating voltage for the core. The calculations are based on historic load data of the particular data stream that a user has selected.

Many variations and embodiments of the above-described invention and method are possible. Although only certain embodiments of the invention and method have been illustrated in the accompanying drawings and described in the foregoing Detailed Description, it will be understood that the invention is not limited to the embodiments disclosed, but is capable of additional rearrangements, modifications and substitutions without departing from the concepts as set forth and defined by the following claims. Accordingly, it should be understood that the scope of the present invention encompasses all such arrangements and is solely limited by the claims as follows.

What is claimed is:

1. A method comprising:
   generating a profile while a processor is processing a data stream by:
      collecting, over time, processor load data for the processor, and
      collecting, over time, memory bandwidth data of a memory associated with the processor;
   associating the profile with the data stream; and determining, according to the profile, a first sequence of operational frequencies to operate the processor while the processor is processing the data stream.

2. The method of claim 1, wherein the method further comprises determining, according to the profile, a second sequence of operational frequencies to operate the memory while the processor is processing the data stream.

3. The method of claim 1, further comprising determining, according to the first sequence of operational frequencies, a sequence of supply voltages to power the processor while the processor is processing the data stream.

4. The method of claim 2, wherein the second sequence of operational frequencies is determined according to the processor load data and the memory bandwidth data.

5. The method of claim 2, wherein the second sequence of operational frequencies is determined according to the processor load data, the memory bandwidth data, and a predetermined ratio between the second sequence of operational frequencies and the first sequence of operational frequencies.

6. The method of claim 2, further comprising applying the profile to the processor and the memory while the processor is processing the data stream.

7. The method of claim 1, further comprising:
generating a plurality of profiles while a processor is processing a corresponding plurality of data streams by:
collecting, over time, processor load data for the processor for each of the plurality of data streams, and
collecting, over time, memory bandwidth data of a memory associated with the processor for each of the plurality of data streams; and
associating each of the plurality of profiles with a corresponding one of the plurality of data streams.

8. The method of claim 7, further comprising applying one of the plurality of profiles to the processor and the memory while the processor is processing a corresponding one of the plurality of data streams.

9. At least one computer-readable storage device comprising program instructions configured for:
generating a profile while a processor is processing a data stream by:
collecting, over time, processor load data for the processor, and collecting, over time, memory bandwidth data of a memory associated with the processor;
associating the profile with the data stream; and
determining, according to the profile, a first sequence of operational frequencies to operate the processor while the processor is processing the data stream.

10. The at least one computer-readable storage device of claim 9, wherein the computer-readable storage device further comprises program instructions configured for determining, according to the profile, a second sequence of operational frequencies to operate the memory while the processor is processing the data stream.

11. The at least one computer-readable storage device of claim 9, further comprising program instructions configured for determining, according to the first sequence of operational frequencies, a sequence of supply voltages to power the processor while the processor is processing the data stream.

12. The at least one computer-readable storage device of claim 10, further comprising program instructions configured for determining, according to the processor load data and the memory bandwidth data, the second sequence of operational frequencies to operate the memory.

13. The at least one computer-readable storage device of claim 10, further comprising program instructions configured for determining the second sequence of operational frequencies to operate the memory according to the processor load data, the memory bandwidth data, and a predetermined ratio between the second sequence of operational frequencies and the first sequence of operational frequencies.

14. The at least one computer-readable storage device of claim 10, further comprising program instructions configured for applying the profile to the processor and the memory while the processor is processing the data stream.

15. The at least one computer-readable storage device of claim 9, further comprising program instructions configured for:
generating a plurality of profiles while a processor is processing a corresponding plurality of data streams by:
collecting, over time, processor load data for the processor for each of the plurality of data streams, and
collecting, over time, memory bandwidth data of a memory associated with the processor for each of the plurality of data streams; and
associating each of the plurality of profiles with a corresponding one of the plurality of data streams.

16. The at least one computer-readable storage device of claim 15, further comprising program instructions configured for applying one of the plurality of profiles to the processor and the memory while the processor is processing a respective one of the plurality of corresponding data streams.

17. A system comprising:
at least one processor configured to:
generate a profile while a processor is processing a data stream by
collecting, over time, processor load data for the processor, and collecting, over time, memory bandwidth data of a memory associated with the processor;
associating the profile with the data stream; and
determine, according to the profile, a first sequence of operational frequencies to operate the processor while the processor is processing the data stream.

18. The system of claim 17, wherein the processor is further configured to determine, according to the profile, a second sequence of operational frequencies to operate the memory while the processor is processing the data stream.

19. The system of claim 17, wherein the processor is further configured to determine, according to the first sequence of operational frequencies, a sequence of supply voltages to power the processor while the processor is processing the data stream.

20. The system of claim 18, wherein the processor is further configured to determine the second sequence of operational frequencies to operate the memory according to the processor load data and the memory bandwidth data.

* * * * *

UNITED STATES PATENT AND TRADEMARK OFFICE
CERTIFICATE OF CORRECTION

Page 1 of 2

PATENT NO.       : 8,225,112 B2
APPLICATION NO.  : 11/995091
DATED            : July 17, 2012
INVENTOR(S)      : Koul et al.

It is certified that error appears in the above-identified patent and that said Letters Patent is hereby corrected as shown below:

The sheet of drawings consisting of Figure 1, should be deleted to appear as per attached figure 1.

In Column 1, Line 11, delete "reduced" and insert -- reduce --, therefor.

In Column 4, Line 65, delete "where" and insert -- were --, therefor.

In Column 6, Line 52, delete "steam" and insert -- stream --, therefor.

In Column 6, Line 56, delete "etc)" and insert -- etc.) --, therefor.

In Column 7, Line 67, delete "steam" and insert -- stream --, therefor.

In Column 8, Line 1, delete "steam" and insert -- stream --, therefor.

In Column 10, Line 37, in Claim 17, delete "by" and insert -- by: --, therefor.

Signed and Sealed this
Fifteenth Day of January, 2013

David J. Kappos
*Director of the United States Patent and Trademark Office*